April 7, 1970   K. Y. REHNSTRÖM ET AL   3,504,404
DEVICE FOR HANDLING LOADS OF WOOD OR THE LIKE
Filed March 14, 1968   2 Sheets-Sheet 2

INVENTORS
Knut Yngve Rehnström
Per Albin Strömbeck

By Pierce, Scheffler & Parker
Attorneys 3,504,404
DEVICE FOR HANDLING LOADS OF WOOD OR THE LIKE
Knut Yngve Rehnström and Per Albin Strömbeck, Sundsvall, Sweden, assignors to Svenska Cellulosa Aktiebolaget, Sundsvall, Sweden
Filed Mar. 14, 1968, Ser. No. 713,204
Claims priority, application Sweden, Mar. 16, 1967, 3,682/67
Int. Cl. B65d *67/02;* B60p *7/06*
U.S. Cl. 24—16               8 Claims

ABSTRACT OF THE DISCLOSURE

A device for handling stacks of cut lumber while maintaining the stack in compact form which includes at least one beam placed transversely under a stack of lumber, a pair of vertical poles, connected to the ends of each beam, at least one of the poles being releasably and adjustably secured to its beam, the poles extending at least half-way up the sides of the stack of lumber and a member extending across the top of the stack of lumber and being adjustably secured to the tops of the pair of vertical poles so that the stack is maintained in a unit of compact form and constant shape for handling with conventional loading and unloading devices.

---

The present invention relates to means for handling large stacks of sawn wood.

The technique of sea-borne transportation by means of so-called container-vessels, developed in recent years, presupposes, in practice, the handling of the goods in large so-called unit loads. Many kinds of products do not offer particularly great problems in respect of bringing the goods together to unit loads and the handling of such units. Other kinds of products may, however, cause difficulties in this respect. Thus, it has been found that sawn wood, brought together to unit loads by means of known devices, cannot be handled advantageously by means of conventional loading and unloading devices.

The purpose of the present invention is to provide for a device which is particularly, but not exclusively, intended for the handling of unit loads of sawn wood.

A device according to the invention comprises a bottom beam, which is meant to extend under a stack of wood, for example in the form of a unit load, in the transverse direction thereof, two substantially vertical side poles, positioned or adapted to be placed one at each end of the bottom beam, and a flexible lifting member, for example in the shape of a wire, a chain or the like, which is adapted to be coupled with the upper end portion of each side pole and which, togther with said side poles and said bottom beam, is adapted to keep the load of wood together in such a manner that the latter can be easily lifted by means of a straddle-legged truck, a crane, an overhead crane or some other auxiliary equipment.

The bottom beam and the side poles consist of rigid members and the connections between them may, according to the invention, be relatively rigid. The surfaces of the bottom beam and those of the side poles, which are to be in contact with the load of wood should be relatively large. The constructive features of the bottom beam and also those of the side poles, just mentioned, offer the advantage of causing the load of wood to keep its correct shape during the handling and, furthermore, the advantage of preventing damage to the wood, the latter circumstance being due to the fact that those surfaces of the lifting means, which are in contact with the wood, by being so large will bring about a favourable distribution of the high pressures, which, during the handling of the load, exist between the lifting means, the wood and the bottom beam and the side poles, respectively.

The invention will be described below in more detail in connection with the accompanying drawings, in which FIGURE 1, in a perspective view, shows a device according to one embodiment of the invention, and FIGURE 2, in a perspective view, shows a so-called unit-load of sawn wood, to which two devices according to FIGURE 1 have been applied for handling said unit load.

Figure 1:
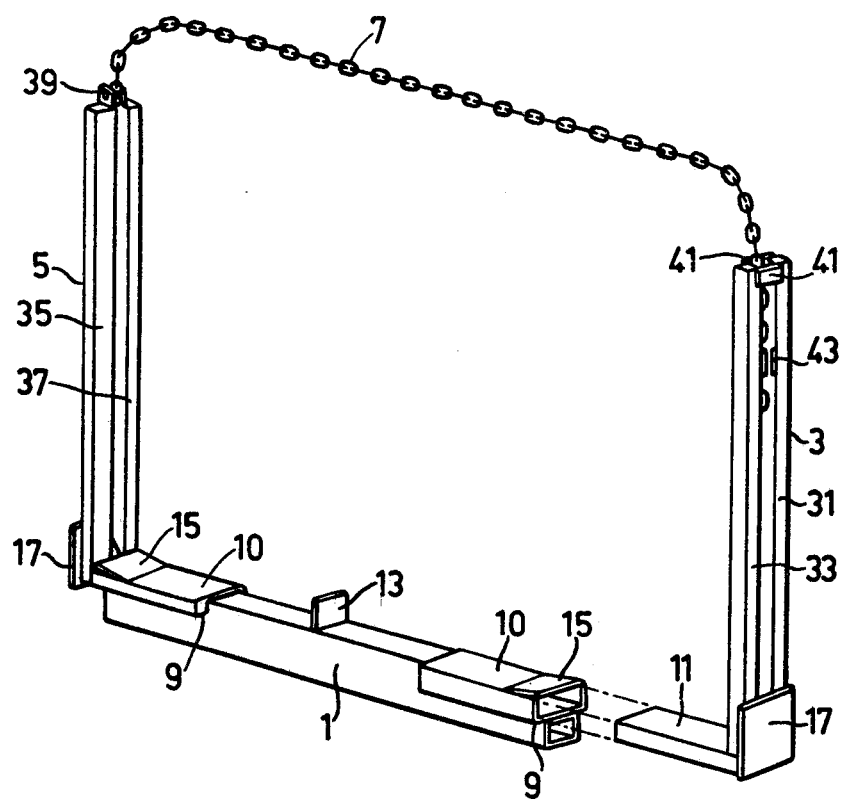

The device according to FIGURE 1 comprises a strong bottom beam 1, two side poles 3 and 5, one at each end of the bottom beam, and a lifting chain 7, all of which are made of suitable materials, for example, steel. The bottom beam 1 may be hollow, its profile being, for example, rectangular. At the middle of its upper side it is provided with an upright plate member 13, the purpose of which is to facilitate the bringing together and the correct positioning of the unit-load of wood to be handled. At its end portions the bottom beam has been provided with reinforcing beam sections 9 having widened surfaces 10 for supporting the load, those portions 15 of said surfaces which are positioned near to the ends of the bottom beam inclining a little upwards and being meant to provide for a certain inclination of the halves of the stack of wood inwards towards a vertical middle plane in the longitudinal direction of the stack of wood or being meant at least to prevent the halves of the stack of wood from being given an outward inclination in relation to said plane.

One of the side poles 3 and 5 may be stationarily secured to one end of the bottom beam 1, whereas the other side pole may be detachably mounted to the bottom beam. However, preferably both side poles may be detachably mounted to the bottom beam, which may be done, for example, in the manner shown in FIGURE 1 in respect of the side beam 3. The said side beam comprises two hollow-profile members or the like, 31 and 33, and at its lower end said beam is rigidly connected to a coupling member 11, extending in the direction of the bottom beam 1 and meant to fit in with a guide, formed by the section 9 of the beam, in which guide the coupling member 11 is lockable in various positions by means of adjustable locking members (not shown), which may be of any known kind and which may, for instance, comprise a displaceable spring, provided on the underside of the section 9 of the beam and adapted to cooperate with holes or the like provided in the underside of the coupling member 11. By such adjusting means the coupling member 11 may be locked in various positions, counting in the longitudinal direction of the bottom beam 1, for the purpose of becoming adjusted to loads of wood of varing widths. The inserting of the coupling member 11, after the load having been placed in its position, may be obtained by actuating the coupling member and the lower portion of the side pole 3, said components having, for that purpose, been provided with protecting plates 17.

The device further comprises a chain 7, one end of which is, by means of a coupling 39, connected to the portions 35 and 37 of the side pole 5, and which is, at its other end, adapted to be coupled to the side pole 3, and according to the embodiment shown, this is obtained by the end portion of the chain, after having been introduced into a passage formed by the portions 31 and 33 and plates 41, conecting said portions with each other, being put into the slot of a chain lock 43 of a kind known per se, which admits of the adjustment by steps corresponding to the length of one chain link. After having been pulled tight around the load of wood the chain may be locked.

Figure 2:
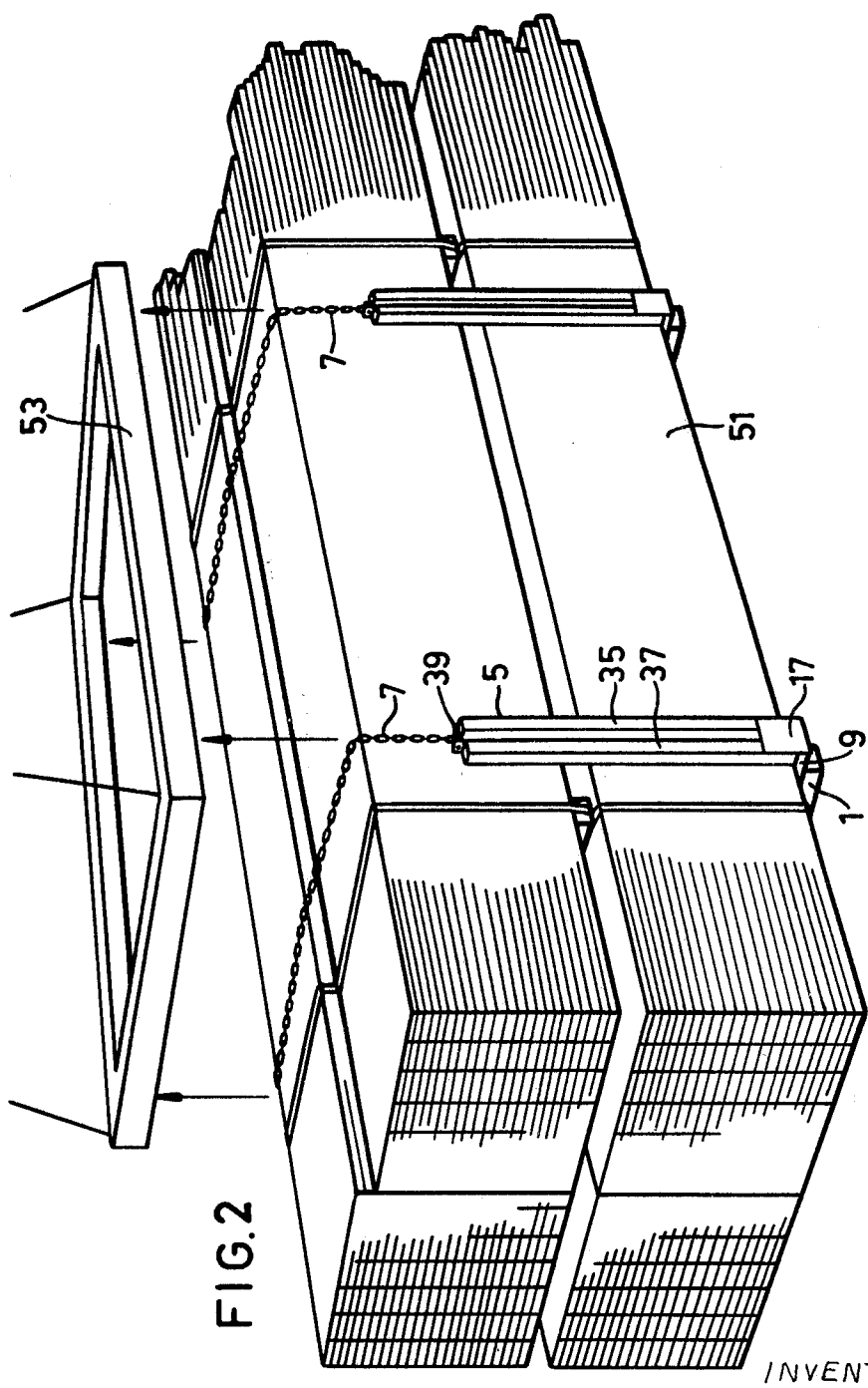

FIGURE 2 illustrates a unit-load 51 of sawn wood, which is embraced by two devices according to FIGURE 1. 53 indicates a lifting frame, to which the chains 7 may be connected, if desired. The lifting frame 53 may form part of a conventional lifting device, for instance, a straddle-legged truck, a crane, an overhead crane or the like. However, preferentially there are used lifting devices, for example, straddle-legged trucks, which grasp the unit load at its underside, and in that case the chains 7 are not used for the very lifting operation but serve just for holding together the load of wood in an efficient manner.

As regards the dimensioning of the bottom beam and of the side poles according to the invention the following many be mentioned. The bottom beams should be dimensioned for taking a total load of at least about 10 tons, corresponding to a unit load comprising four standards of wood. The side poles should be dimensioned so as to be able to prevent laterial displacements of parts of the load and their heights could be at least half the height of the total height of the load.

The invention is not restricted to the embodiment shown and described, because it may be varied and modified in different ways within the scope of the invention. Thus, the flexible member holding the side poles together may, in certain cases, be replaced by a more or less rigid member, for example, a beam or the like, and in that case the side poles are made so long that they reach above the load of wood. In that case the rigid member may be provided with adjustable means for pressing the side poles together against the load of wood.

What is claimed is:

1. A device for handling stacks of lumber comprising a beam adapted to extend transversely under and support a stack of lumber, a pair of substantially vertical side poles rigidly connected at their lower ends to the ends of said beam, at least one pole being releasably secured to the beam, and lifting means extending across the top of said stack of lumber, said lifting means being releasably secured to the tops of said poles, so that the beam, poles and lifting means will, when secured together, maintain the stack in a unit of compact form and constant shape for lifting by said lifting means.

2. A device as claimed in claim 1, wherein the beam and side poles are rigid, said poles forming fixed predetermined angles with said beam when connected thereto.

3. A device as claimed in claim 2 wherein said poles form substantial right angles with said beam when connected thereto.

4. A device as claimed in claim 1 wherein the beam and the side poles are rigid and of sufficient width to provide extensive bearing surfaces so as to distribute the pressure against the stack of lumber and prevent damage thereto while being lifted.

5. A device as claimed in claim 1 wherein said at least one pole which is releasably secured to said beam is adjustably secured to the beam so as to accommodate stacks of varying width.

6. A device as claimed in claim 1 wherein the lifting means extending across the top of the stack of lumber is a flexible member, at least one end of which is adjustably secured to one of the side poles so as to enable the device to be tightened about a stack of lumber to maintain its compact form and constant shape while being lifted thereby.

7. A device as claimed in claim 1, wherein the beam is provided on its upper bearing surface adjacent the ends thereof with inwardly inclined areas to prevent lumber resting thereon from inclining outwardly when the device is secured together.

8. A device as claimed in claim 1, wherein the beam and side poles are rigid, said poles forming fixed predetermined angles with said beam when connected thereto, said beam and side poles being of sufficient width to provide extensive bearing surfaces so as to distribute the pressure against the stack of lumber and prevent damage thereto, said at least one pole which is releasably secured to said beam being adjustable secured to said beam so as to accommodate stacks of varying width, said lifting means being a flexible member, at least one end of which is adjustably secured to one of the side poles to enable the device to be tightened about a stack of lumber to maintain its compact form and constant shape for lifting by said lifting means, said beam being provided on its upper bearing surface adjacent the ends thereof with inwardly inclined areas to prevent lumber resting thereon from inclining outwardly when the device is secured together.

References Cited

UNITED STATES PATENTS

| | | | |
|---|---|---|---|
| 1,245,607 | 11/1917 | Maxwell | 280—179.1 |
| 1,392,343 | 10/1921 | Leishman | 280—179.1 |
| 2,116,381 | 5/1938 | Burke. | |
| 2,274,165 | 2/1942 | Ritzau | 24—16 XR |
| 2,768,004 | 10/1956 | Wagner | 280—179.1 |

DONALD A. GRIFFIN, Primary Examiner

U.S. Cl. X.R.

280—179